Figure 1:
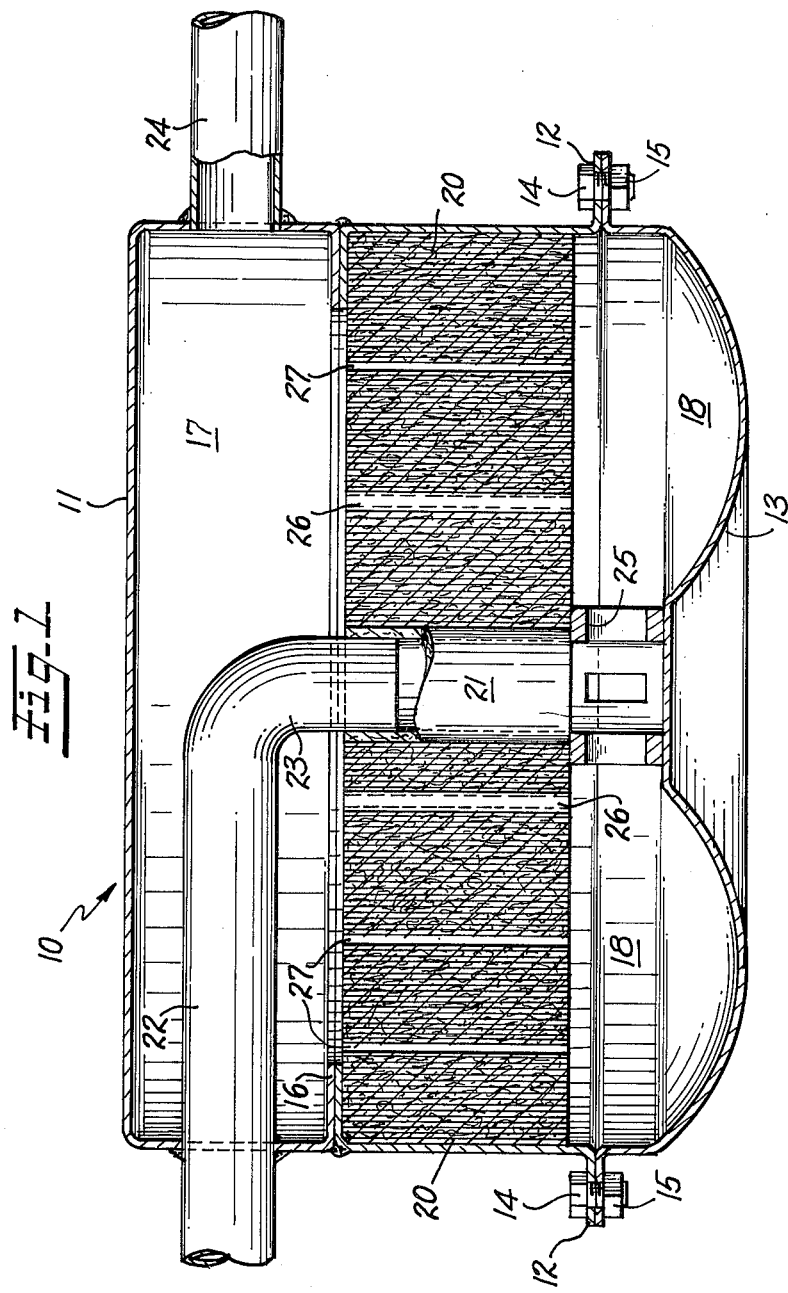

United States Patent [19]

Hain

[11] 4,093,422
[45] June 6, 1978

[54] AUTOMOTIVE EXHAUST SYSTEM USING FILTER CONTAINING CALCIUM CARBONATE COATING

[75] Inventor: Paul O. Hain, Hamilton, Ohio

[73] Assignee: Champion International Corporation, Stamford, Conn.

[21] Appl. No.: 691,479

[22] Filed: Jun. 1, 1976

[51] Int. Cl.² ..................... B01J 1/22; B01D 35/18
[52] U.S. Cl. ..................... 23/284; 23/288 F; 55/DIG. 30; 55/524; 423/212; 428/537; 428/539
[58] Field of Search ............ 23/284, 288 F, 288 PC; 55/DIG. 30, 520, 524, 278; 428/537, 539

[56] References Cited
U.S. PATENT DOCUMENTS

| | | | |
|---|---|---|---|
| 3,925,021 | 12/1975 | Yoshino et al. | 55/524 X |
| 3,951,865 | 4/1976 | Norback | 23/288 FC |
| 3,954,417 | 5/1976 | Jalbing | 23/288 FC |

Primary Examiner—James H. Tayman, Jr.
Attorney, Agent, or Firm—Dressler, Goldsmith, Clement, Gordon & Shore, Ltd.

[57] ABSTRACT

Automotive exhaust gases, and especially the exhaust gases which have been further oxidized by a treatment in a catalytic converter, are treated by passing them through a filter containing paper coated with a calcium carbonate coating. The paper is desirably coated on both sides with heavy coatings and wound into a roll with spacers extending through the roll to permit the gases to pass therethrough. The calcium carbonate desirably constitutes at least 85% of the weight of pigments and fillers in the coating and the proportion of binder does not exceed 20% of the total weight of pigments and fillers. The acidic gases in the exhaust, and particularly the oxides of sulfur, react with the finely divided particles of calcium carbonate in the coating to form an ash which flakes off from the lower face of the roll while the gases pass upwardly through the roll.

8 Claims, 2 Drawing Figures

AUTOMOTIVE EXHAUST SYSTEM USING FILTER CONTAINING CALCIUM CARBONATE COATING

The present invention relates to the treatment of automotive exhausts.

Automotive exhaust pollution is a major problem in America today, with over 100,000,000 automobiles on the road.

In the absence of catalytic converter treatment of the exhaust gases, these gases contain significant proportions of carbon monoxide and unburned hydrocarbons, as well as some sulfur dioxide and some oxides of nitrogen, mostly nitrous oxide. Also, the standard fuels contain organic lead compounds and some of these are also present in the exhaust.

In an effort to reduce the proportion of carbon monoxide and unburned hydrocarbons, catalytic converters are employed to catalytically increase the extent of combustion, but this is sometimes incomplete which leaves some unburned carbon monoxide and unconsumed hydrocarbons. However, the catalytic oxidation which reduces the concentration of carbon monoxide and hydrocarbons in the exhaust may also cause some conversion of sulfur dioxide to sulfur trioxide. The conversion of nitrous oxide to higher oxides of nitrogen, such as nitric oxide may also occur. These higher oxides are much more obnoxious then the lower ones. Also, the catalytic converters are expensive and require the use of unleaded fuels.

This invention proposes a simple calcium carbonate treatment of the exhaust gases, and is useful either as an aftertreatment of the exhaust gases following catalytic oxidation, or as a primary treatment of the exhaust gases in the absence of catalytic oxidation.

In accordance with this invention, finely divided particles of calcium carbonate are coated on an inexpensive supporting substrate, preferably an ablative fibrous sheet such as paper, and the coated sheet is formed into a gas filter and interposed in the exhaust line from an internal combustion engine to cause the exhaust gases to contact the calcium carbonate. In preferred practice, a catalytic converter is used, and the exhaust from the converter passing through the filter of this invention.

The invention includes the calcium carbonate-coated paper which is unusual in preferred practice because of: (1) the high proportion of calcium carbonate in the coating; (2) the high coating weight applied; (3) the fact that the carbonate-coated surface is unfinished; (4) the virgin fiber content of the paper is desirably unbleached for greatest strength and economy; and (5) the adhesive or binder content is minimized.

The invention further includes the paper filter in which the carbonate-coated paper is wound around a central core to form a roll, the wound paper including intermittently dispersed spacers to spread the convolutions of the paper and thereby permit the exhaust gases to pass through the roll. These spacers are preferably tubes, e.g., straws.

The invention also includes a filter structure in which the roll of wound paper is centrally positioned within a container to divide the same into an inlet compartment below the roll and an outlet compartment above the roll with the plane of the paper within the roll paralleling the movement of the exhaust gases through the roll. The roll of wound paper is preferably positioned to be horizontal so that the gases move upwardly through the roll which forces the active portion of the carbonate-surfaced paper to be its lower edge. This lower edge ablates and flakes away as the filter is consumed, thus forming an ash which drops through the inlet chamber to the bottom of the filter without obstructing the roll of wound paper, and revealing a fresh lower edge for the continued treatment of the incoming exhaust gases.

This invention thus treats exhaust gases which contain oxides of sulfur together with oxides of nitrogen, particularly nitrous oxide. It appears that the acidic sulfur oxide, which is usually sulfur dioxide, is captured by the calcium carbonate, thus forming calcium sulfite. Any sulfur trioxide would be captured as calcium sulfate. Similarly, nitrous oxide might be captured as calcium nitrite and $NO_2$ would be captured as $CaNO_3$, but it is likely that the nitrous oxide would react with the calcium sulfite to form $CaSO_4.N_2O$ which is an oxidizing agent. Thus, an oxidizing environment will be created leading to more complete conversion of any carbon monoxide or unburned hydrocarbons in the exhaust gases to carbon dioxide and water. Also, any lead compounds in the exhaust gases should be absorbed.

One interesting aspect of the present invention from the standpoint of treating the exhaust from a catalytic converter is the possibility that such exhaust will inadvertently include higher oxides of sulfur or nitrogen because the catalytic oxidation is or becomes insufficiently specific to carbon. These higher oxides are not only obnoxious and must be removed, but any $NO_2$ present will be converted to calcium nitrate which is a powerful oxidizing agent capable of reducing the residual hydrocarbon and carbon monoxide content below that obtainable with usual catalysts.

While the calcium carbonate-coated paper which is used in this invention bears a resemblance to conventional calcium carbonate-coated paper, there are numerous significant differences which distinguish the products which are preferably used in this invention.

First, when calcium carbonate is used in paper coating, it is employed in admixture with other fillers and pigments, such as clay, and it does not exceed 85% of the mixture. Here, the activity of the carbonate is maximized by using larger proportions thereof, preferably 90% or more.

Second, ordinary paper must be capable of withstanding a fold without having the coating flake off. This normally limits calcium carbonate-based coatings to a weight of less than 15 pounds per side per ream. In this invention, it is important to maximize the amount of carbonate which is brought into the filter by a given weight of paper fiber, and this means that the coating weight would desirably exceed 15 pounds per side per ream.

Third, paper is normally coated to improve its capacity to be printed, and this normally requires that the coated paper be finished in some way which compacts and thereby renders more uniform and level the coating which is to receive the print. The finishing operation normally used is calendering. In this invention it is desired to maintain the fine particle size of the calcium carbonate which is applied, so compacting operations such as calendering are avoided.

Fourth, it is desired to bring in as much carbonate coating as possible with the least amount of supporting fiber. This suggests the presence of a proportion of unbleached virgin fiber. Preferably from 10–50% of the furnish solids, will be constituted by unbleached virgin fiber, more preferably 20–40%. Ordinary coated paper would have its virgin fiber component bleached which weakens it to make it more expensive and less suited to this invention.

Another factor of interest is the binder content. The binder in this invention is needed merely to prevent flaking and dusting of the coating while it is being processed, and this means that one can use significantly less adhesive than is usual. In this invention, aside from the minimal need noted above, the binder gets in the way of the desired contact with the exhaust gases, and hence as little binder as possible is used. Using gelatinized starch as the binder, 10-15% binder, based on the pigment, is the preferred proportion to provide adequate pigment retention. Substantially larger proportions are needed for a practical paper coating, and these would reduce the effectiveness of the paper for the exhaust treatments intended herein. Thus, and in this invention, the proportion of binder in the calcium carbonate coating should preferably not exceed 20% based on the total weight of pigment and filler.

In preferred practice, it is desirable to provide a filter having an approximately 1 year useful life. At an average car usage of 10,000 miles per year at 15 miles per gallon, the approximately 0.05% sulfur content of gasoline indicates that about 6-7 pounds of calcium carbonate will be adequate to absorb the sulfur containing oxides generated in a period of 1 year.

The invention is illustrated in the following example of presently preferred practice.

Starting with a 36 pound per ream (500 sheets 25 inches × 38 inches) rawstock, this is furnished using 30% of unbleached pine as an illustrative economical long fiber. The balance of the furnish is re-pulped waste paper which is untreated except to insure good machine operation.

Any fine, precipitated calcium carbonate useful for paper coating may be used herein since these have fine particle size and provide a high surface area, but coarse grades are also useful. The commercially available Mississippi M-60 grade having 90% of its particles below 3 microns in diameter to provide a specific surface of 30,000 - 35,000 square centimeters per gram is illustrative of preferred practice and is used in this example.

The calcium carbonate contains a mixture of 92.5 parts of coating grade calcium carbonate in admixture with 7.5 parts of clay and 12.5 parts of gelatinized corn starch as binder. This coating is applied as a size to provide 22 pounds of dry coating on each side of the 36 pound paper base. The size is applied in an alkaline condition. This forms a finished sheet weighing about 80 pounds per ream and the coatings are left uncalendered. These thick coatings crack and flake off if the paper is folded, so they do not possess any normal utility.

Straws having a length of 3 inches and a diameter of about ¼ inch are formed from the above paper, and a 3 inch wide strip of the paper is wound around a tubular core having an inside diameter of 1¼ inch and an outside diameter of 1½ inch, these straws being inserted one every 20 feet. This winding and straw insertion is continued until the roll diameter reaches 12 inches which provides a filter roll weighing about 12 pounds, and which provides about 6 pounds of calcium carbonate, sufficient to handle the sulfur oxides in the exhaust for almost a year of average driving.

Of course, the filter roll can be made larger or smaller depending upon the circumstances and the time period of use without replacement which is desired.

Figure 2:
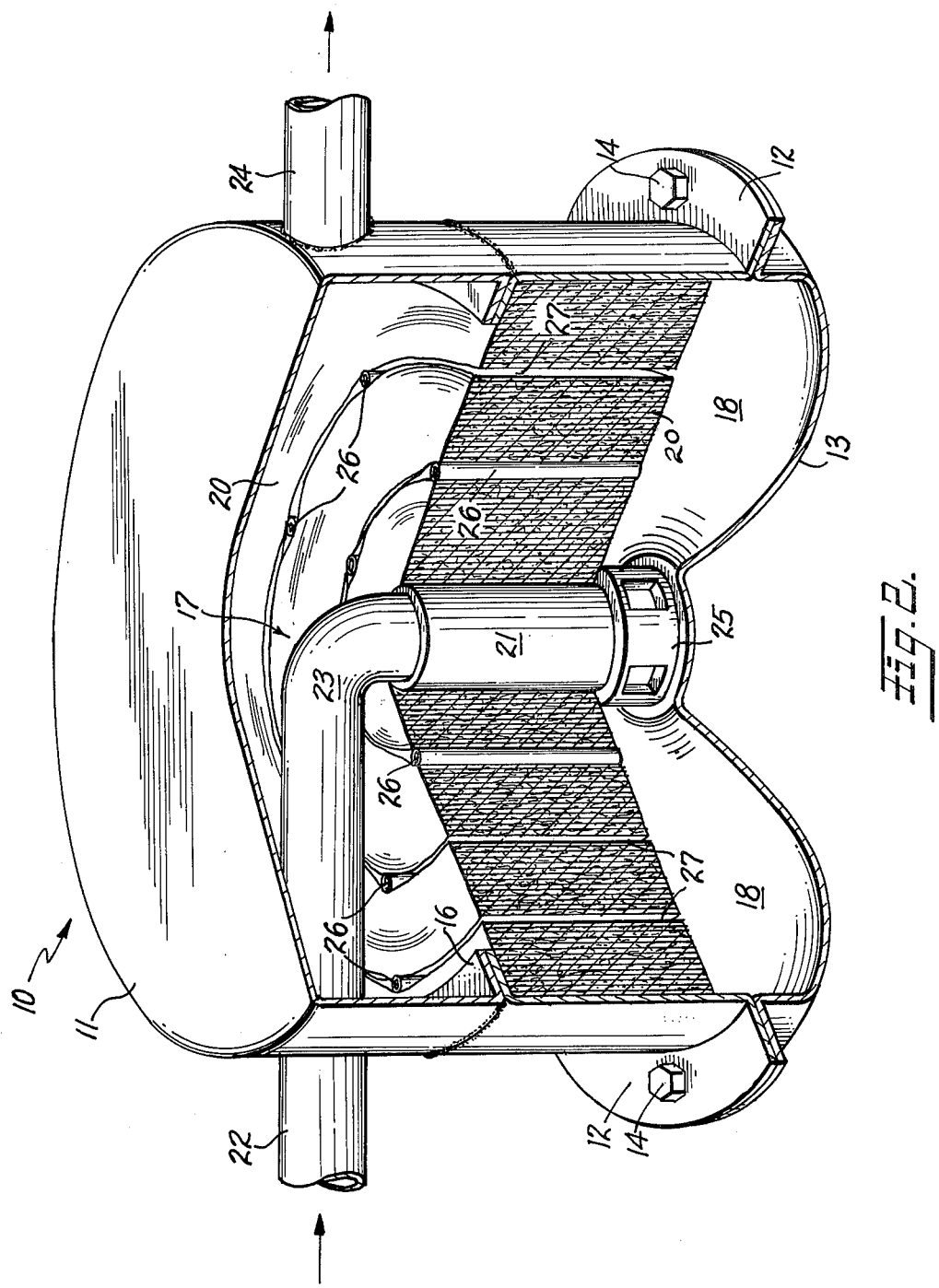

The invention will be more fully understood from the accompanying drawings of an illustrative filter unit constructed in accordance with the invention. In these drawings:

FIG. 1 is a side elevation in section showing an illustrative filter unit with a filter roll of this invention in place therein; and FIG. 2 is a perspective view of the filter unit.

Referring more particularly to the drawings, the filter unit 10 is constituted by an upper housing 11 having a lower flange 12 to which is removably secured an ash collecting pan 13 by means of bolts 14 and nuts 15. The housing 11 is divided by an inwardly extending flange 16 into an upper exhaust chamber 17 and a lower inlet chamber 18. The filter roll 20 mounted on tubular core 21 is fitted into the open lower end of housing 11 until the top of roll 20 is stopped by flange 16.

The exhaust chamber 17 has fitted thereto an inlet pipe 22 which curves downwardly at its inner end 23 to snugly receive the core 21, and an outlet pipe 24. As is evident, the filter unit 10 is mounted beneath a vehicle in any convenient fashion, and the inlet pipe 22 is connected to the exhaust (either from the engine or from the catalytic converter if present) while the outlet pipe 24 is either connected to the tail pipe, or it can be permitted to serve as the tail pipe.

For purposes of illustration, and to accommodate a roll 3 inches in width and 12 inches in outside diameter, the inside diameter of the housing 11 is dimensioned to snugly receive the filter roll 20 with flange 12 about ¼ inch below the lower face of roll 20. The exhaust chamber 17 extends 3 inches above flange 16 with the inlet pipe having a diameter of 1¼ inch to provide a snug fit in the core 21. The outlet pipe 24 would have the same diameter and would be mounted in line with the inlet pipe 22 with the axis of these pipes being about 1½ inches above the upper face of roll 20.

After roll 20 is inserted, pan 13 is secured and, as the nuts 15 are tightened on bolts 15, a spider lug 25 bears against core 21 to force the core 21 and roll 20 into the desired final position.

The upper housing 11 in the form shown is made of sheet metal which is welded together. As can be seen, the housing is formed of two pieces which are united by welding at the flange 16.

The operation is simple. The exhaust gases pass through inlet pipe 22 and core 21 and reach the lower face of roll 20 by passing through the openings in spider lug 25. The most active portion of the filter roll 20 is its lower face, and as the material of the roll is reacted, it falls into the ash collecting pan 13. The treated gases pass upwardly through filter 20 via straws 26 and the openings 27 in the roll windings 20 which are formed by the interposed straws 26.

The treated exhaust gases thus reach exhaust chamber 17 and exit via outlet pipe 24.

While the invention is particularly adapted for the treatment of automotive exhausts, the filters of this invention are also useful with combustion gases of diverse type, and particularly those containing oxides of sulfur as the result of the burning of sulfur-containing fuels.

I claim:

1. In an exhaust system for an internal combustion engine, the improvement comprising a filter contained in a container and interposed in the exhaust line, said filter containing paper formed into a gas filter in which the plane of the paper is parallel to the movement of the exhaust gases, said paper being coated with finely divided particles of calcium carbonate, said paper being ablative under the conditions encountered in said exhaust system, said calcium carbonate constituting at least 85% of the weight of pigments and fillers in the coating, and the proportion of binder in the coating not exceeding 20% of the total weight of pigments and fillers, and said filter being positioned so that when the exhaust gases are passed through the filter, the coated paper can fall away from the filter where it is initially contacted by said exhaust gases.

2. An exhaust system as recited in claim 1 in which the virgin fiber content of the paper is unbleached.

3. An exhaust system as recited in claim 1 in which the calcium carbonate coating is unfinished.

4. An exhaust system as recited in claim 1 in which said filter is horizontal with the coated substrate constituting the filter being vertical, and the exhaust gases are passed upwardly through the filter.

5. An exhaust system as recited in claim 4 in which a space is provided below the filter for the collection of ash.

6. An exhaust system as recited in claim 4 in which said filter comprises a roll of calcium carbonate-coated paper having spacers extending vertically through the roll.

7. An exhaust system as recited in claim 1 in which said paper is coated on both sides with said calcium carbonate coating, the coating weight exceeding 15 pounds per side per ream.

8. An exhaust system as recited in claim 7 in which said calcium carbonate coatings are unfinished.

* * * * *